United States Patent [19]

Crawford

[11] Patent Number: 5,625,947
[45] Date of Patent: May 6, 1997

[54] METHOD FOR FORMING A VACUUM PORT MANIFOLD

[75] Inventor: Charles K. Crawford, Wilton, N.H.

[73] Assignee: Kimball Physics, Inc., Wilton, N.H.

[21] Appl. No.: 400,357

[22] Filed: Mar. 8, 1995

[51] Int. Cl.$^6$ ............................................. B23P 15/00
[52] U.S. Cl. .................................... 29/890.14; 29/890.141
[58] Field of Search ...................... 29/890.14, 890.141, 29/557, 558; 285/150

[56] References Cited

U.S. PATENT DOCUMENTS

| | | | |
|---|---|---|---|
| 3,630,547 | 12/1971 | Hartshorn, Jr. ............................ | 285/150 |
| 4,239,263 | 12/1980 | George ....................................... | 285/150 |
| 4,450,613 | 5/1984 | Ryan et al. ............................. | 29/890.14 |
| 4,694,634 | 9/1987 | Anderson et al. ...................... | 29/890.14 |
| 4,760,861 | 8/1988 | Botnick .................................. | 29/890.14 |
| 5,203,384 | 4/1993 | Hansen ..................................... | 285/150 |
| 5,261,704 | 11/1993 | Araujo et al. ............................ | 285/150 |

*Primary Examiner*—Irene Cuda
*Attorney, Agent, or Firm*—Hayes, Soloway, Hennessey, Grossman & Hage, P.C.

[57] ABSTRACT

An improved method for manufacturing a vacuum port manifold having a plurality of ports each having a planar sealing surface derived from an intermediate unitary structure having a compound curved surface at least in part. The planar sealing surfaces are formed by machining selected planes across the corresponding compound curved surface.

7 Claims, 12 Drawing Sheets

METHOD FOR FORMING A VACUUM PORT MANIFOLD

FIELD OF THE INVENTION

This invention relates to vacuum systems, and more particularly to hardware components for vacuum systems and methods of manufacturing such components. The invention has particular utility with respect to all-metal flanged manifolds for high vacuum (HV) and ultra-high vacuum (UHV) systems and will be described in connection with such utility, although other utilities are contemplated.

BACKGROUND OF THE INVENTION

Figure 1:
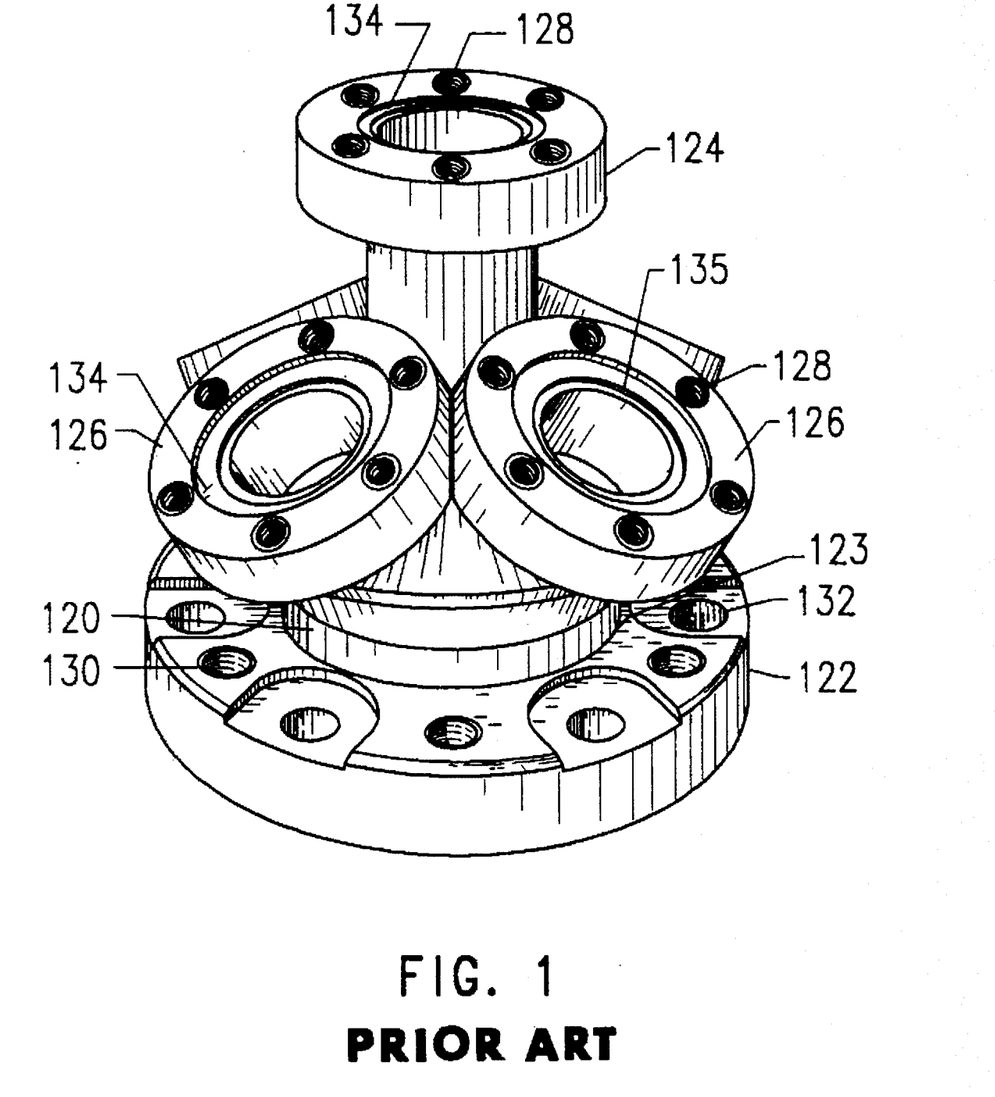
FIG. 1 is a perspective view of a five-way manifold made in accordance with the prior art.

All-metal manifolds are widely used in UHV vacuum systems to interconnect system components such as emitters and detectors, vacuum lines, and the like. Referring to FIG. 1, a conventional, all-metal manifold, available from Kimball Physics, Inc., Wilton, N.H., comprises a cylindrical main body section 120 having an annular base flange 122 adjacent one end thereof. A flanged end port member 124 is mounted on body 120 opposite flange 122, and a plurality of flanged side port members 126 (four are shown for illustration purposes) are mounted equi-spaced around the circumference of body 120 and angled downwardly and inwardly so that imaginary lines running centrally of ports 124 and 126 will converge at a single point (not shown). Each flange 124, 126 includes a plurality of tapped bolt holes 128 for joining similarly sized and shaped flanges carried by other adapters, instruments and/or conduits, while base flange 122 includes a set of tapped holes 130 and a set of clear holes 132, e.g. for mounting the manifold to a chamber or the like. In order to assure a gas-tight connection, the face of base flange 122 and port members 124 and 126 each have an annular recess 134, each having an annular "knife edge" 135 for accommodating and engaging a soft metal gasket material, e.g. in accordance with teachings of U.S. Pat. No. 3,208,758.

Body 120 and port members 124 and 126 typically are formed separately of stainless steel such as type 304 stainless, and are welded together to form a gas-tight construction. Base flange 122 also is formed separately, and may be welded to body 120 in fixed position, or may be rotatably retained on body 120 by means of a rotatable flange retaining ring 123, which in turn is welded to body 120.

Figure 2:
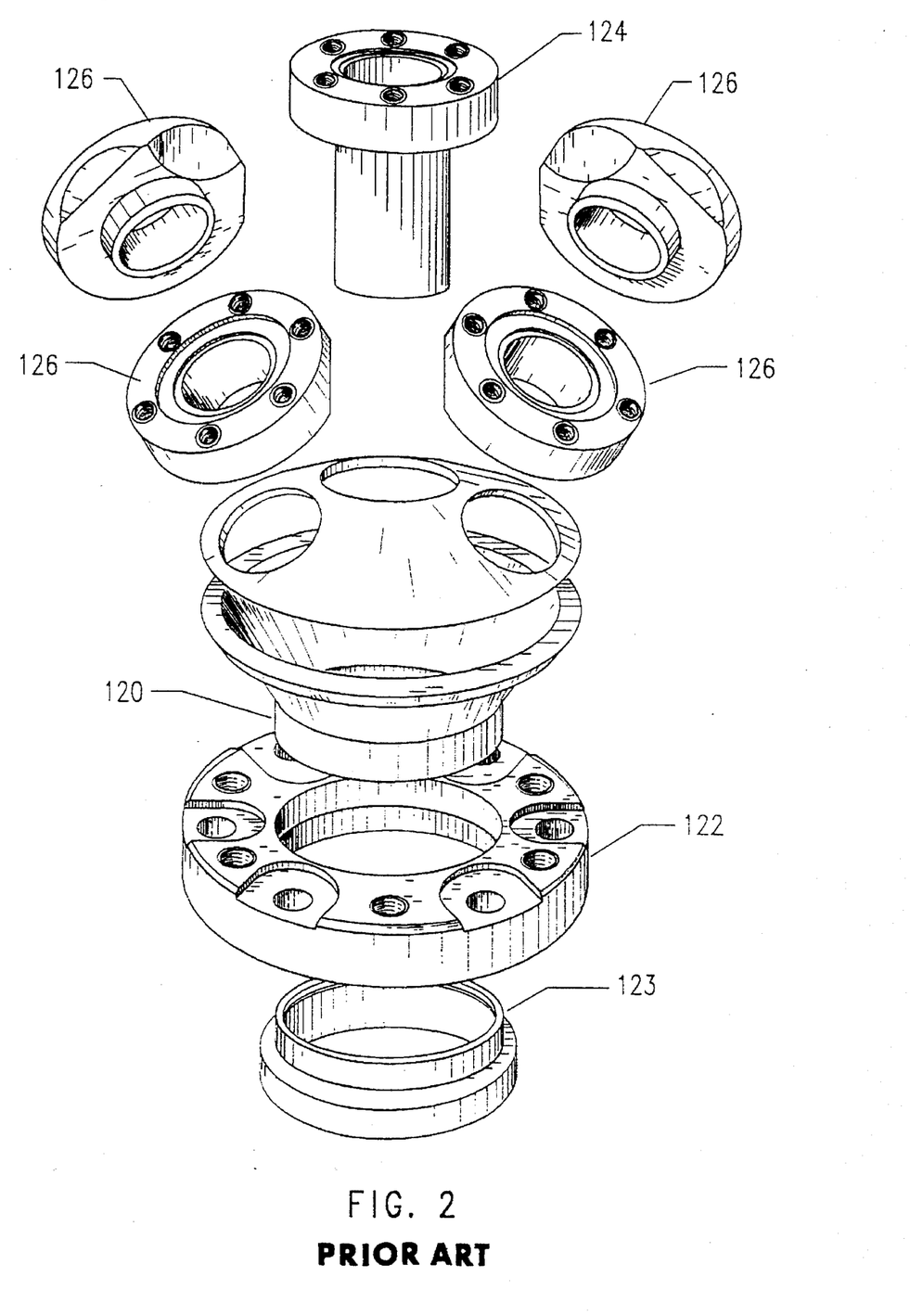
FIG. 2 is an exploded view, similar to FIG. 1.
Figure 3:
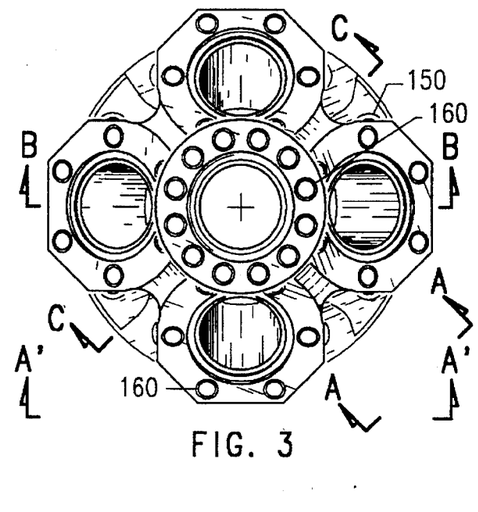
FIG. 3 is a top plan view of a five-way manifold made in accordance with one embodiment of the present invention.
Figure 4:
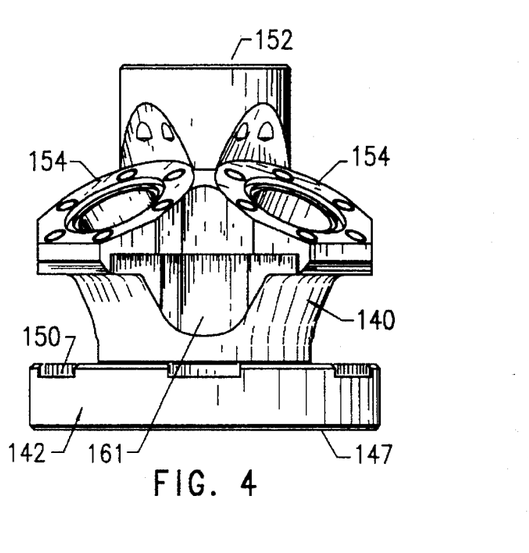
FIG. 4 is a side elevation view of the manifold of FIG. 3, taken from side A—A.
Figure 5:
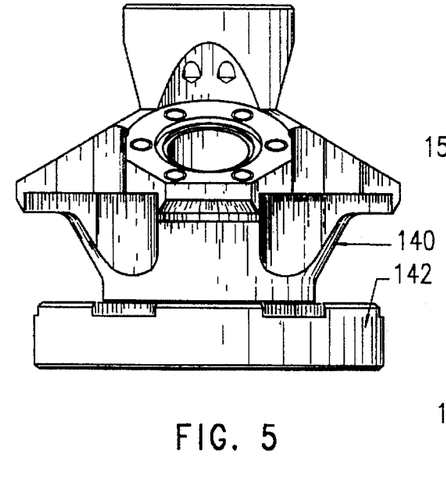
FIG. 5 is a side elevational view of the manifold of FIG. 3, taken from side A'—A'.
Figure 6:
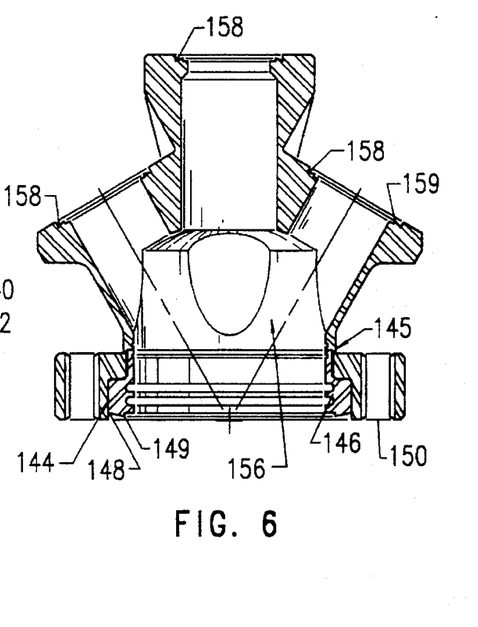
FIG. 6 is a cross-sectional view of the manifold of FIG. 3 taken along Section B—B.
Figure 7:
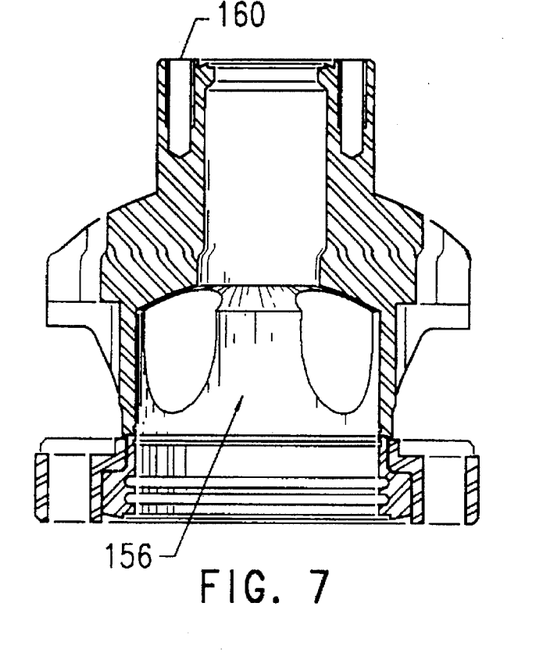
FIG. 7 is a cross-sectional view of the manifold of FIG. 3 taken along section C—C.
Figure 8:
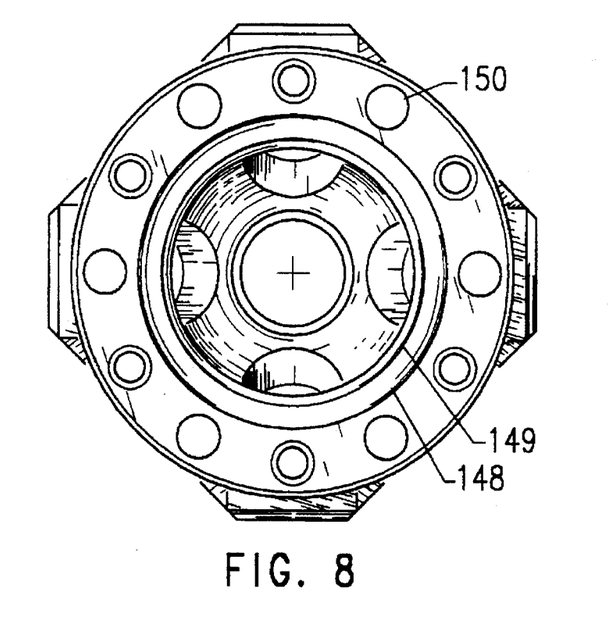
FIG. 8 is a bottom plan view of the manifold of FIG. 3.

While prior art manifolds of the type described above have achieved widespread use and are available commercially from several sources, fabrication is a somewhat difficult and costly process. First, the main body section 120, end port member 124 and side port members 126 are separately machined from round metal stock, e.g. on a metal lathe. Holes 136 (see FIG. 2) are then drilled in main body section 120. The flanged end walls of end port member 124 and side port members 126 are machined flat, holes 128 are tapped therein, and annular recess 134 and knife edge 135 are machined in the flanged end walls of port members 124 and 126. The ends of port members 124 and 126 opposite the flanged end walls of port members 124 and 126 are then machined to fit together with main body section 120, and the port members are carefully positioned and lined-up, e.g. using optical alignment means, and tacked in position by welding. The port members are then finish welded and again checked for alignment. Finally, base flange 122, which also is separately formed, is mounted on rotatable flange ring 123 which in turn is welded to body section 120. As will be appreciated, machining the various parts is expensive and time-consuming. Also, achieving exact alignment of port members 124 and 126 presents a problem. Moreover, end port member 124, which must be made long and thin-walled to provide sufficient clearance for the side port members 126, is mechanically compromised. Consequently, end port member 124 may flex out of alignment should a heavy component or large external force be applied to the end port.

It is thus a general object of the present invention to provide improved methods of manufacturing all-metal manifolds which overcome the aforesaid and other disadvantages of the prior art.

Another object of the present invention is provide an improved method for manufacturing all-metal manifolds having improved performance and reliability characteristics.

SUMMARY OF THE INVENTION

According to the present invention, these and other objects that advantages are achieved in an all-metal manifold in which the body, side and end ports are all machined from a unitary block of metal.

BRIEF DESCRIPTION OF THE DRAWINGS

For a better understanding of the present invention, together with further objects, advantages and capabilities thereof, reference is made to the accompanying drawings in which like numerals depict like parts, and in which.

DETAILED DESCRIPTION OF THE INVENTION

Referring to FIGS. 3–8, a five-way manifold of the present invention comprises a unitary body member 140 and a rotatable flange assembly 142. Rotatable flange assembly 142 is of conventional construction, and has a generally circular shape and is machined out of a metal such as stainless steel. Rotatable flange assembly 142 has a recess 144 into which is rotatably mounted a flange ring 146. The latter is welded to body 140 at 145 so as to form a rotatable flange, in known manner. The end face 147 of flange assembly 142 has an annular recess at 148 which has an annular knife edge 149 for accommodating and engaging a metal sealing gasket (not shown) in known manner.

A plurality of bolt holes 150 are formed through flange assembly 142 for bolting the assembly to a mating component or device (not shown). Holes 150 may be threaded or smooth walled. In a preferred embodiment of the invention, flange assembly 142 includes both threaded holes and smooth walled holes.

Body 140 comprises an end port 152 and four angled side ports 154 spaced equi-distant from one another around the circumference of the body 140. End port 152 and side ports 154 are hollow and communicate with a hollow 156 formed centrally of body 140. The end faces of port 152 and side ports 154, which form the sealing surfaces of the body ports 152 and 154, each include an annular recess 158 having an annular knife edge 159 for accommodating and engaging a metal sealing gasket (not shown) in known manner. A plurality of blind threaded holes 160 are formed into the end faces of end port 152 and side ports 154 for accommodating bolts for mounting mating components or devices (not shown).

Figure 9:
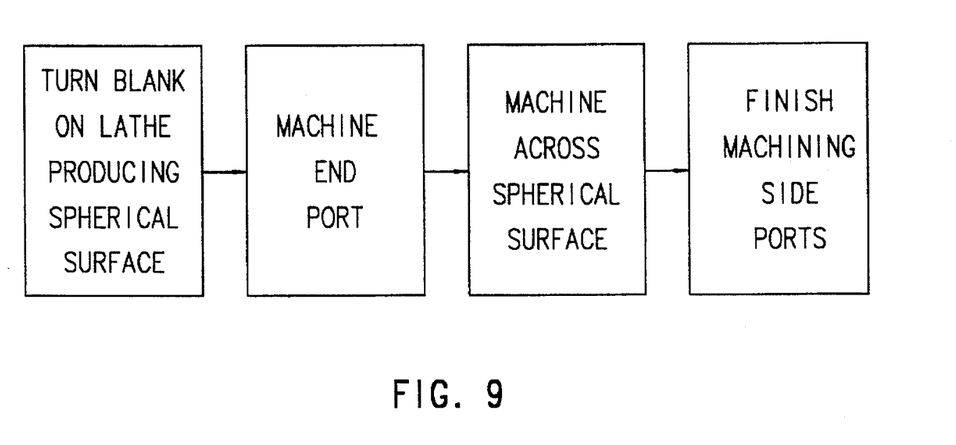
FIG. 9 is a block flow diagram of the process for forming the main body part of the manifold of FIG. 3 according to a preferred embodiment of the present invention.
Figure 10:
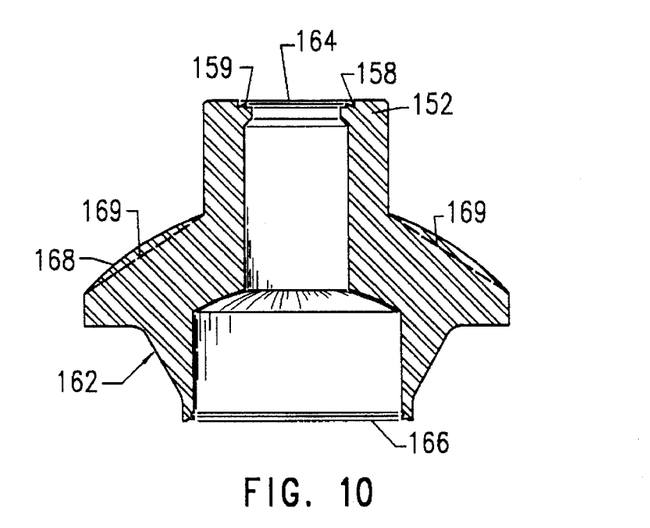
FIG. 10 is a side elevational view, in cross section, showing the main body part of the manifold of FIG. 3 at an intermediate step in the manufacturing process.

A feature and advantage of the present invention results from forming body 140, including ports 152 and 154, as a unitary piece. Referring also to FIGS. 9 and 10, starting with a short cylindrical blank of stainless steel, the blank is turned on a lathe to produce a rough turned blank 162 having a spherical surface portion 168. Thereafter blank 162 is milled out at 164 and 166. Threaded holes 160, annular recess 158 and knife edge 159 also may be formed at this time whereby to form the end port 152 sealing surface. Thereafter, the spherical surface portion 168 of blank 162 is machined flat across selected planes (shown in phantom at 169), e.g. using fly cutters to form the planar end wall surfaces of side ports 154. For example, in order to form four side ports 154, e.g. as in the embodiment shown in FIGS. 3–8 cuts are made across four planes. Annular recesses 158 and knife edges 159 are then milled in the planar end wall surfaces of side ports 154 whereby to form the side port 154 sealing surfaces, the ports are bored out at 170, blind threaded holes 160 formed therein, and the side walls 161 cut back in order to reduce weight and provide clearance for accessing bolt holes 150.

The flange assembly 142 which is separately formed in known manner is then welded to body 140 in known manner.

As can be seen from the foregoing, the present invention provides a process for making improved manifolds which overcomes the aforesaid and other disadvantages of the prior art. A particular feature and advantage of the present invention which results from machining body 140 from a unitary piece of metal is that milling tolerances can be extremely tightly controlled using numerically controlled milling machines. Thus, alignment of the side ports and end port is assured. Also, all but one weld line is eliminated, and there is far more metal supporting the end port 152 than in conventional construction. As a result, vacuum manifolds made in accordance with the present invention are stronger, and the end port 152 is more resistant to movement. The invention also provides simplicity and economy in the manufacturing process.

This invention is susceptible to modification. For example, referring to FIGS. 11–13, there is shown a two-way manifold indicated generally at 180, made in accordance with the present invention. Two-way manifold 180 comprises a unitary body including an integrally formed flanged base 182 and two angled side ports 184, 186. Flanged base 182 includes a facial annular recess 188 having an annular knife edge 190 for accommodating and engaging a soft metal gasket in known manner, and a plurality of smooth wall holes 192 and threaded holes 194.

Figure 11:
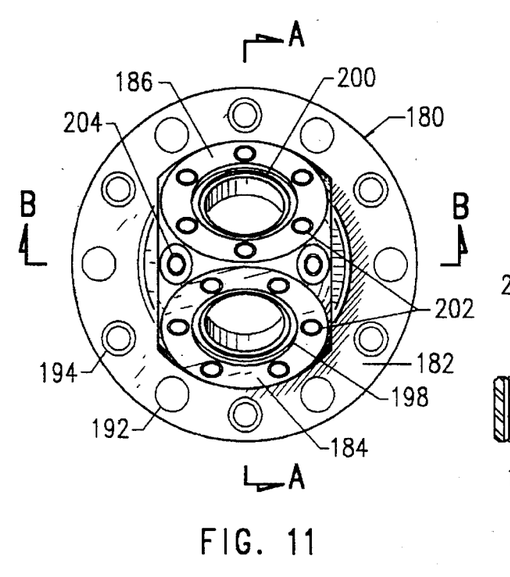
FIG. 11 is a top plan view of a two-way manifold made in accordance with another embodiment of the present invention.
Figure 12:
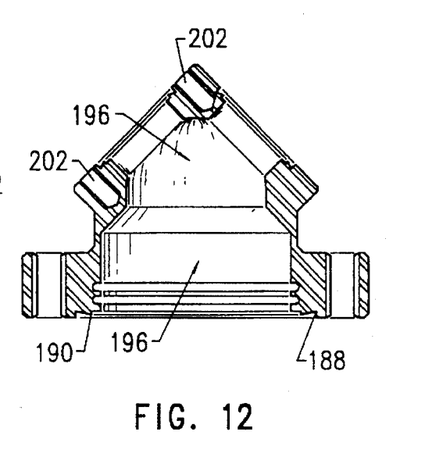
FIG. 12 is a cross-sectional view of the two-way manifold of FIG. 11 taken along line A—A.
Figure 13:
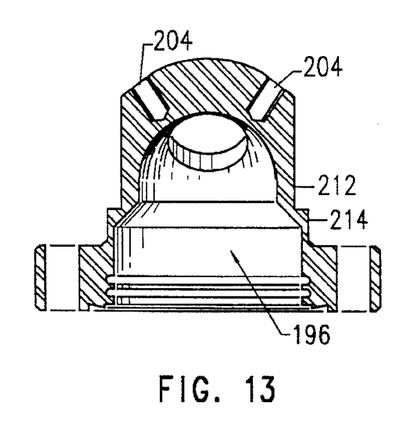
FIG. 13 is a cross-sectional view of the two-way manifold shown in FIG. 11, taken along line B—B.
Figure 14:
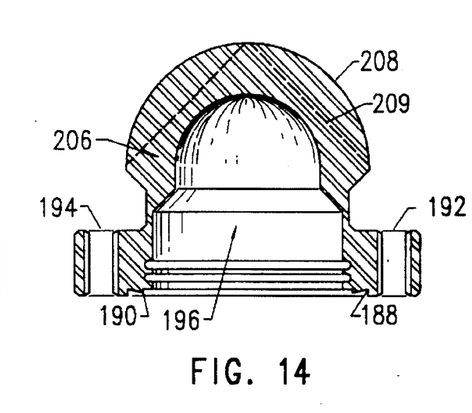
FIG. 14 is a side elevational view, in cross section, showing the two-way manifold of FIG. 11 at an intermediate step in the manufacturing process.

The two angled side ports 184, 186 are hollow and communicate with a common hollow 196 formed centrally of body 180. As before, ports 184 and 186 each include planar sealing surfaces with a facial annular recess 198 having an annular knife edge 200 for accommodating and engaging a metal sealing gasket. A plurality of blind threaded holes 202 are formed in the face of side ports 184, 186. Additional blind threaded holes 204 are formed between ports 184, 186 for affixing accessories.

Figure 15:
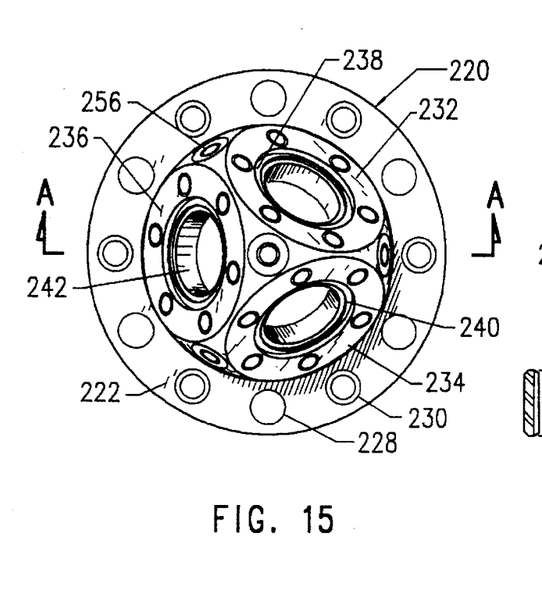
FIG. 15 is a top plan view of a three-way manifold made in accordance with the present invention.

As before, two-way manifold 180 may be formed from a unitary piece of metal. Referring also to FIG. 15, starting with a short cylindrical blank of stainless steel, the blank is turned on a lathe to produce a rough turned blank 206 having a spherical surface portion 208. Holes 192 and 194, annular recess 188 and annular knife edge 190, and hollow 196 may all then be formed.

Figure 16:
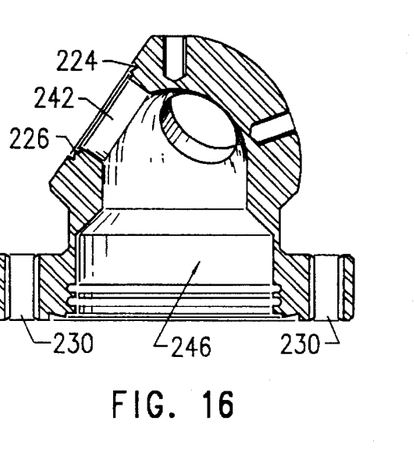
FIG. 16 is a cross-sectional view of the three-way manifold of FIG. 15 taken along line A—A.

Thereafter, the spherical surface portion 208 of blank 206 is machined flat across two planes shown in phantom at 209 in FIG. 16, e.g. using fly cutters, to form the planar end wall sealing surfaces of side ports 184, 186. Annular recesses 198 and annular knife edges 200 are then milled in the planar end wall surfaces of ports 184, 186, the ports bored out at 210, and blind threaded holes 202 formed in the planar end wall surfaces of ports 184, 186. Blind threaded holes 204 also may be formed at this time. Finally, the sides of side ports 184, 186 are machined flat at 212 and 214.

Figure 17:
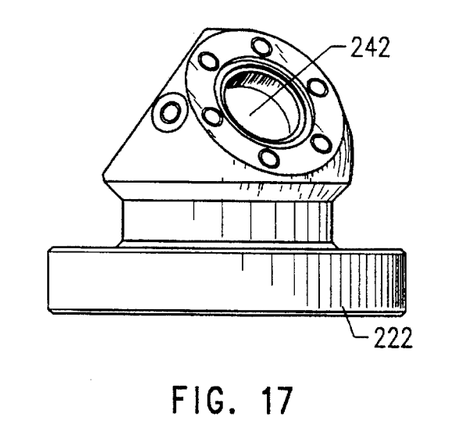
FIG. 17 is a side elevational view of the three-way manifold of FIG. 15.

Referring to FIGS. 15–17, there is shown a three-way manifold 220 made in accordance with yet another embodiment of the present invention. Three-way manifold 220 is similar to two-way manifold 180 (FIGS. 11–13) and comprises a unitary construction including an integral flanged base portion 222 having a recess 224 and an annular knife edge 226 for accommodating and engaging a metal sealing gasket. Also, flange 222 includes a plurality of smooth wall holes 228 and threaded holes 230. Three-way manifold 220 also includes three port planar sealing faces 232, 234, 236, each of which includes an annular recess 238 and annular knife edge 240 for accommodating and engaging a metal sealing gasket. Planar port faces 232, 234, 236 are spaced apart 180° and are angled at 45° from base flange 220. Port faces 234, 236 and 238 are bored through at 242 and communicate with an inner chamber 246 which is bored through flange 222.

Figure 18:
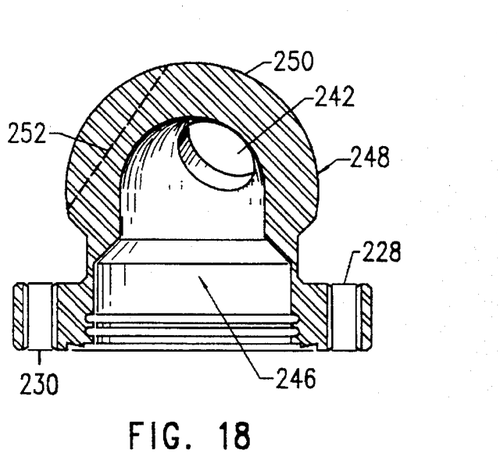
FIG. 18 is a cross-sectional view of the three-way manifold of FIG. 15 at an intermediate step in the manufacturing process.
Figure 19:
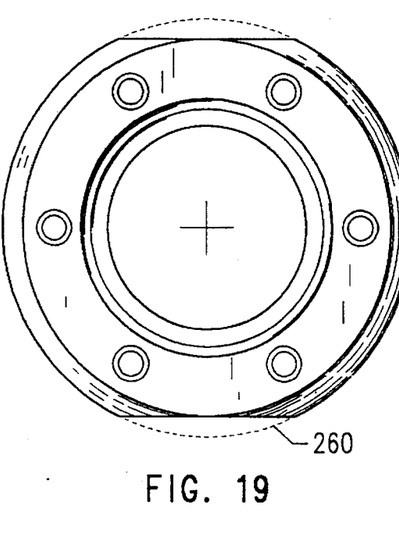
FIGS. 19–23 are top plan views of yet other manifolds, connectors and adapters made in accordance with the present invention.
Figure 20:
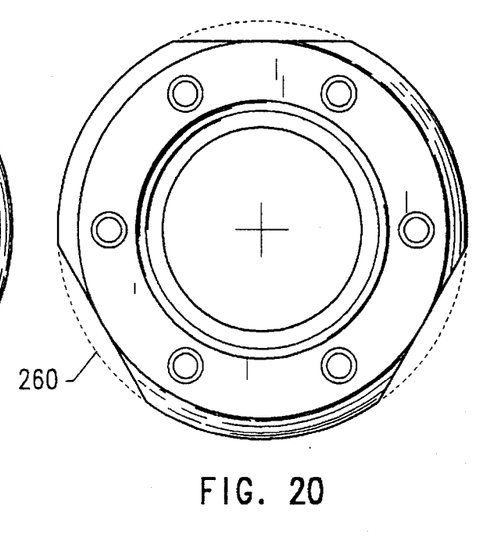
Figure 21:
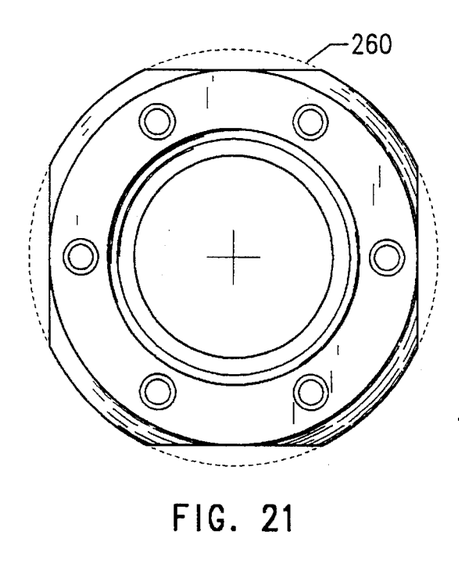
Figure 22:
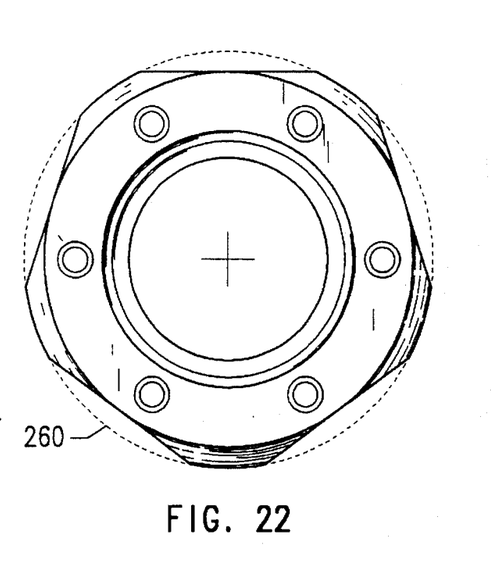
Figure 23:
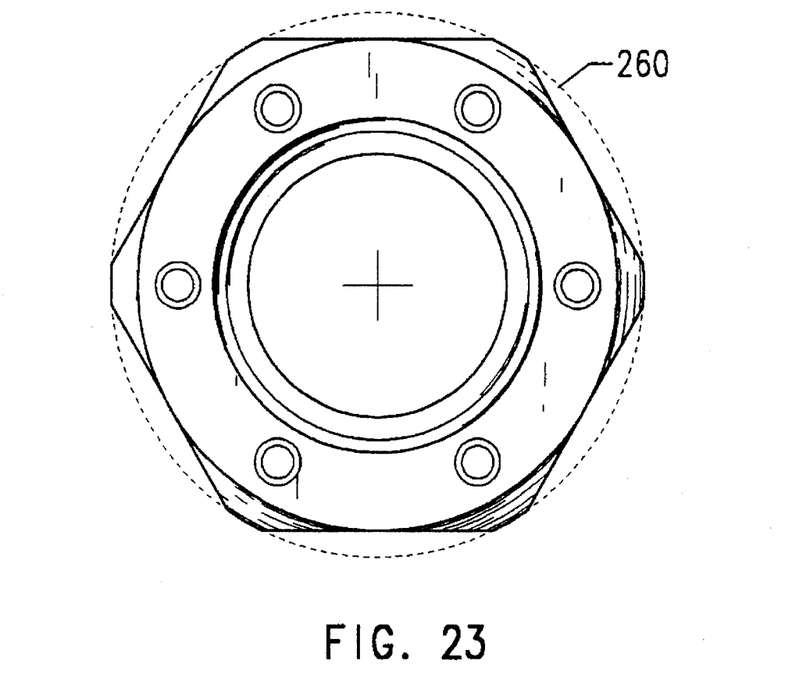

Referring also to FIG. 18, three-way manifold 220 is formed as a unitary piece starting with a short cylindrical blank of stainless steel. The blank is turned on a lathe to produce a rough turned blank 248 having a spherical surface portion 250. Thereafter, spherical surface portion 250 is machined flat across three planes (only one of which is shown in phantom at 252) using fly cutters to form the planar end wall sealing surfaces of flanges 232, 234, 236. Bores 242, annular recesses 238 and annular knife edges 240 are then machined in the planar end wall surfaces, blind threaded holes 256 are bored in the planar end wall surfaces and also at selected locations in the cylindrical surface 258 remaining after the three planes are cut. Finally, bore 246, annular recess 224 and annular knife edges 226 are machined through flange 222, and holes 228 and 230 are bored through flange 222.

Various changes may be made in the foregoing without departing from the spirit and scope of the invention. For example, while the base flange in the five-way manifold shown in FIGS. 3–8 was formed separately as a rotatable flange, the base flange could be made as a unitary part of the manifold, for example, as illustrated in the case of the two-way and three-way manifolds of FIGS. 11–13 and 15–17. Similarly, the base flange of the two-way and three-way manifolds of FIGS. 11–13 and 15–17, respectively, may be formed separately and made rotatable.

Figure 24:
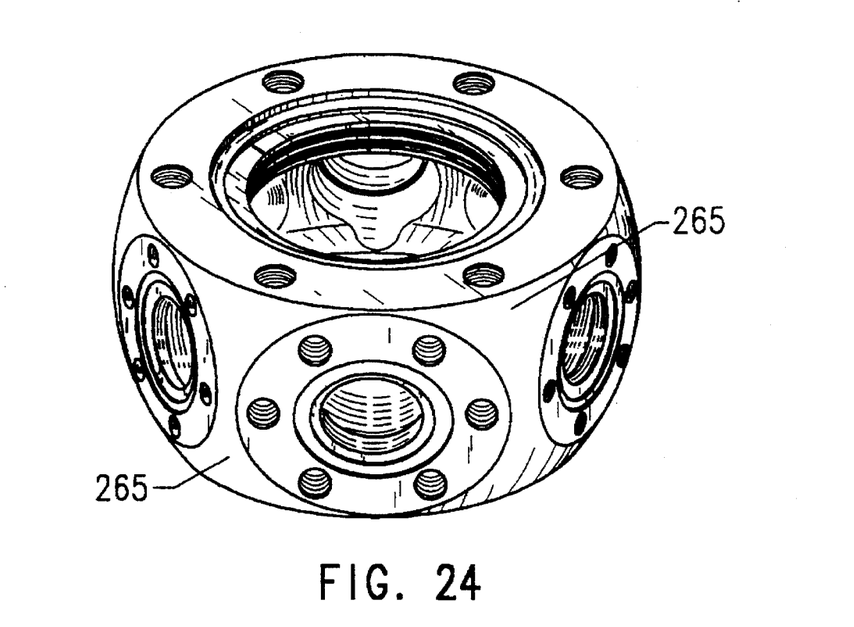
FIG. 24 is a perspective view of an eight-way manifold made in accordance with the present invention.

Yet other changes may be made without departing from the spirit and scope of the invention. For example, and with reference to FIGS. 19–24, following the manufacturing process of the present invention, it is possible to form, e.g. three-way, four-way, five-way, six-way, seven-way or even eight-way manifolds, connectors and adapters, all from a unitary piece of metal. As can best be seen in FIGS. 19–23, for manifolds, connectors and adaptors having ports which bisect only two planes, the parts can be machined directly from cylindrical blanks by machining the planar end wall sealing surfaces of the ports by cutting an appropriate number of planes directly across the cylindrical surface (shown in phantom at 260) of the blank. Alternatively, as shown in FIG. 24, the blank may first be formed with spherical surfaces so that when the sealing surfaces are formed by cutting across planes, rounded surfaces 265 are left.

Figure 25:
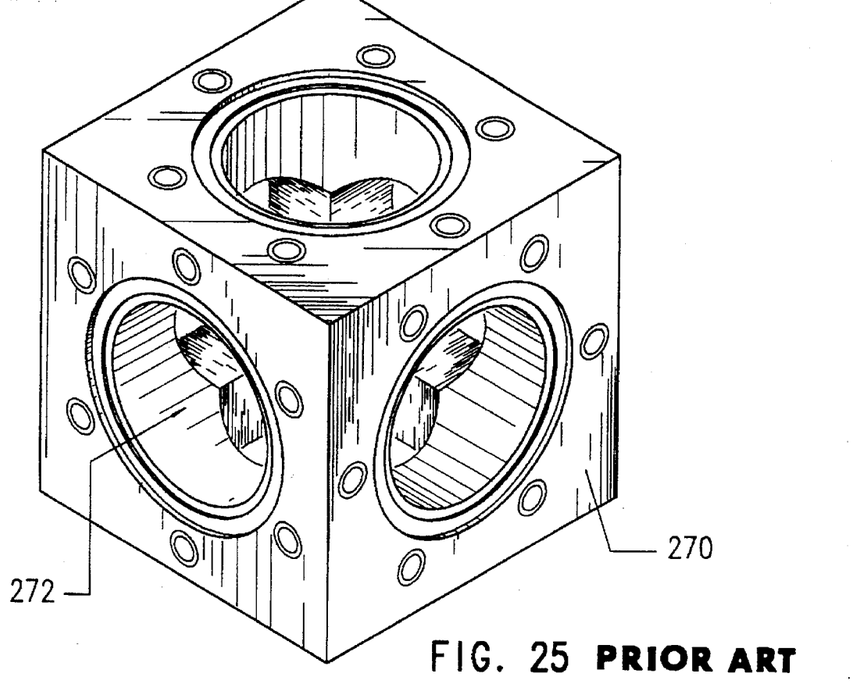
FIG. 25 is a perspective view of a six-way prior art cube chamber.
Figure 26:
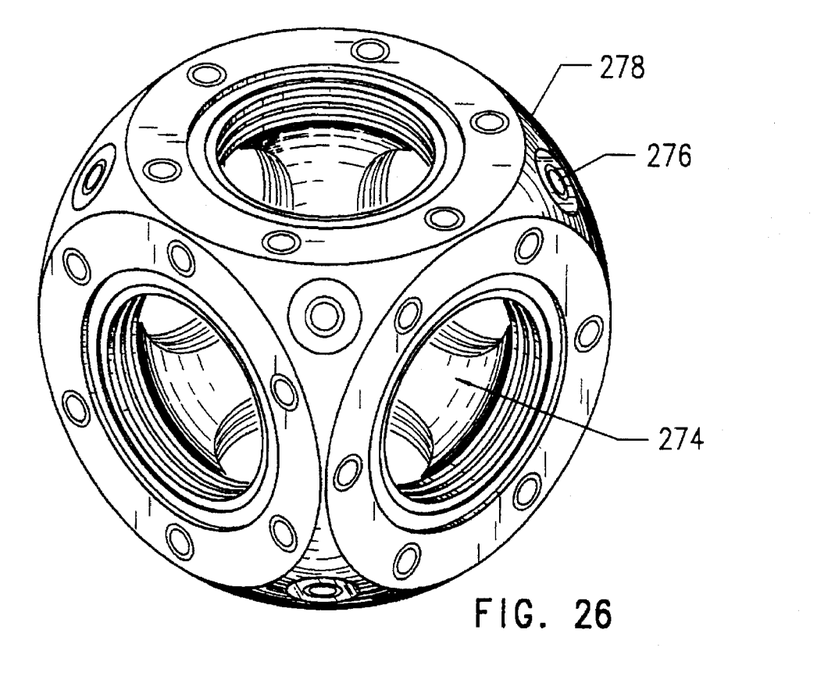
FIG. 26 is a side elevational view of a six-way chamber made in accordance with the present invention.

The manufacturing process of the present invention also may be used advantageously to form reaction chambers of unitary construction. Referring specifically to FIG. 25, six-way cube chambers have been machined from solid blocks of metal. However, such prior art six-way cube chambers have several disadvantages. For one, prior art six-way cube chambers have substantial excess material at their corners 270, and thus are heavy. Also, prior art six-way cube chambers have very limited interior space 272 and thus have limited capacity for tools, etc. Six-way cube chambers made in accordance with the present invention (see FIG. 26) are lighter weight and, have substantially larger and unincumbered interior space 274. Also, six-way cube chambers made in accordance with the present invention may be provided with blind-threaded holes 276 on their exterior spherical surfaces 278 for fixturing, heaters or other tools.

Figure 27:
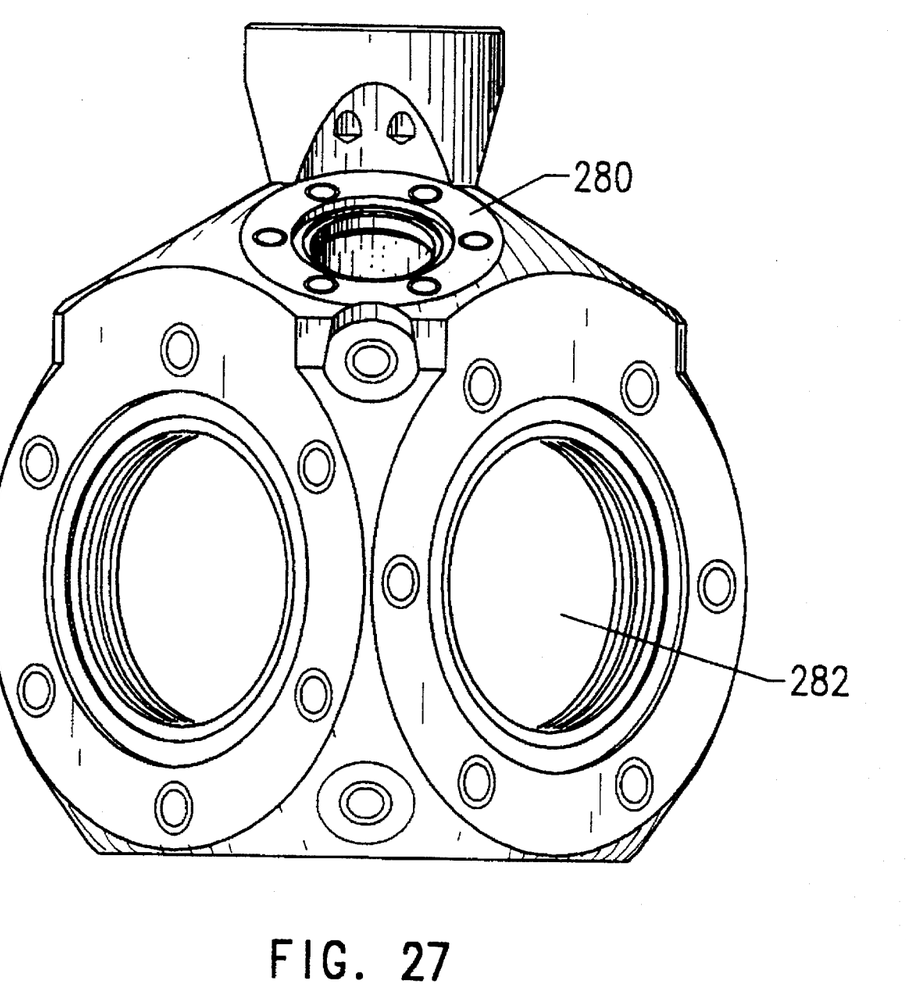
FIG. 27 is a side elevational view of ten-way chamber made in accordance with the present invention.

Referring to FIG. 27, it is also possible to fabricate, for example, a ten-way chamber from a unitary block of metal using the process of the present invention, by forming a five-way manifold 280 integral with a base cube chamber 282.

Figure 28:
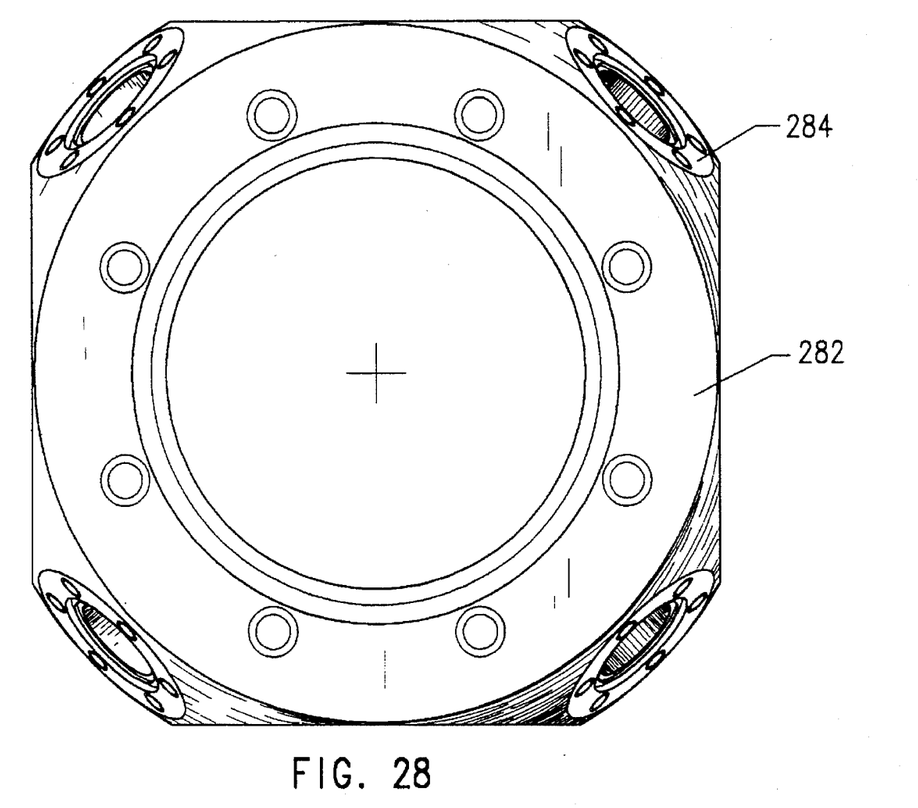
FIG. 28 is a top plan view of a fourteen-way chamber made in accordance with the present invention.
Figure 29:
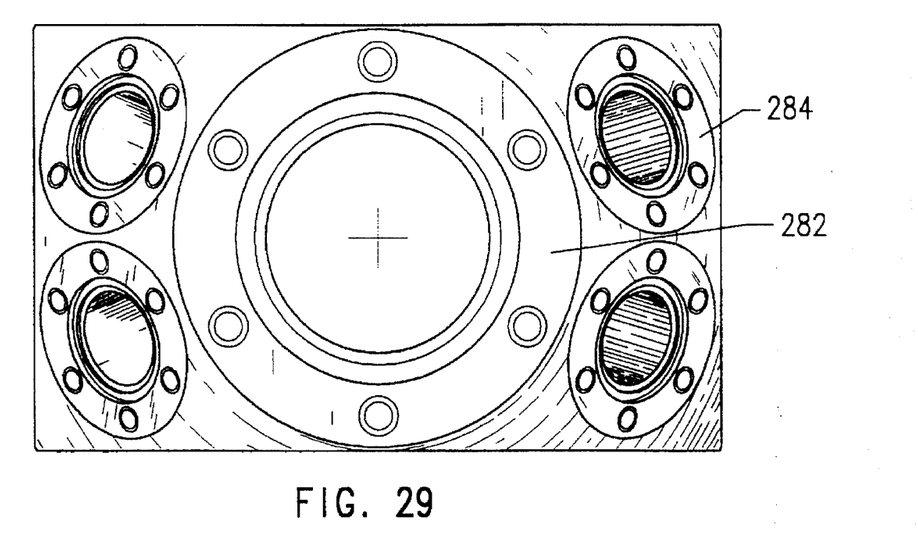
FIG. 29 is a side elevational view of the fourteen-way chamber of FIG. 28.

Referring to FIGS. 28 and 29, it is also possible to form different diameter sealing surfaces 282, 284 by cutting across different planes.

As can be seen from the foregoing, the present invention provides several significant advantages. For one, chambers made in accordance with the present invention have increased internal volume for a given size. This translates to more working space, less mass and higher pumping speeds. Moreover, chambers made in accordance with the present invention can be designed with customized port angles and higher density port packing than possible with conventional constructions. While several preferred embodiments of the invention have been disclosed in detail, it will be understood that other embodiments are possible. For example, it is also possible to form circular sealing surfaces by cutting across other compound curved surfaces such as ellipsoids or the like.

Still other changes may be made without departing from the spirit and scope of the invention.

I claim:

1. A method for forming a vacuum port manifold comprising a metal body defining a hollow, and having a plurality of spaced ports each having a planar sealing surface communicating with one another via said hollow, which method comprises providing a blank, machining the surface of said blank to form a compound curved surface at least in part, machining said compound curved surface across selected planes to form planar surfaces; boring into said planar surfaces to form said hollow, and machining said planar surfaces to form said planar sealing surfaces.

2. A method according to claim 1, and including the step of machining said blank so as to form a spherical surface at least in part, and machining selected portions of said spherical surface across selected planes to form said planar sealing surfaces.

3. A method according to claim 1, and including the step of machining said blank so as to form a cylindrical surface at least in part, and machining selected portions of said cylindrical surface across selected planes to form said planar sealing surfaces.

4. A method according to claim 1, and including the step of machining said blank so as to form an ellipsoid surface at least in part, and machining selected portions of said ellipsoid surface across selected planes to form said planar sealing surfaces.

5. A method for forming a vacuum port manifold comprising a metal body defining a hollow, and having a plurality of spaced ports each having a planar sealing surface communicating with one another via said hollow, which method comprises providing a blank having a compound curved surface, machining the compound curved surface of said blank across selected planes to form planar surfaces, boring into said planar surfaces to form said hollow, and machining said planar surfaces to form said planar sealing surfaces.

6. A method according to claim 5, wherein said blank has a cylindrical surface and including the step of machining said cylindrical surface so as to form a spherical surface at least in part, and machining said selected portions of said spherical surface across selected planes to form said planar sealing surfaces.

7. A method according to claim 5, wherein said blank has a cylindrical surface and including the step of machining said cylindrical surface so as to form a ellipsoid surface at least in part, and machining said selected portions of said ellipsoid surface across selected planes to form said planar sealing surfaces.

* * * * *